(12) United States Patent
Saito

(10) Patent No.: US 11,457,616 B2
(45) Date of Patent: Oct. 4, 2022

(54) WATER PURIFICATION SYSTEM AND FILTRATION BLOCK

(71) Applicant: QUABIT, INC., Saitama (JP)

(72) Inventor: Kiyofumi Saito, Saitama (JP)

(73) Assignee: QUABIT, INC., Kawaguchi (JP)

( * ) Notice: Subject to any disclaimer, the term of this patent is extended or adjusted under 35 U.S.C. 154(b) by 125 days.

(21) Appl. No.: 16/790,000

(22) Filed: Feb. 13, 2020

(65) Prior Publication Data

US 2020/0267948 A1 Aug. 27, 2020

(30) Foreign Application Priority Data

Feb. 27, 2019 (JP) .............................. JP2019-34637

(51) Int. Cl.
*A01K 63/04* (2006.01)
*C02F 3/06* (2006.01)
(Continued)

(52) U.S. Cl.
CPC ............ *A01K 63/045* (2013.01); *B01D 29/56* (2013.01); *B01D 35/301* (2013.01); *C02F 1/00* (2013.01);
(Continued)

(58) Field of Classification Search
CPC .... C02F 3/06; C02F 3/121; C02F 3/30; C02F 3/2826; C02F 3/301; C02F 2201/006; C02F 2203/006; C02F 2301/028; C02F 1/001; A01K 63/045; A01K 63/04; Y02W 10/10; B01D 29/0052; B01D 29/50; B01D 29/56; B01D 35/30; B01D 35/301; B01D 35/303; B01D 2201/30; B01D 2201/301; B01D 2201/306
(Continued)

(56) References Cited

U.S. PATENT DOCUMENTS 3,693,798 A * 9/1972 White ................ B01D 24/4631
210/167.26
5,474,673 A * 12/1995 Ludlow ................ A01K 63/045
210/255
(Continued)

FOREIGN PATENT DOCUMENTS

JP  S 58-195697  12/1983
JP  H1080237    3/1998
(Continued)

OTHER PUBLICATIONS

JP 2019-111260, Notification of Reasons for Refusal dated Sep. 30, 2019, 5 pages—Japanese, 6 pages—English.
(Continued)

*Primary Examiner* — Joseph W Drodge
(74) *Attorney, Agent, or Firm* — Andrew F. Young; Nolte Lackenbach Siegel

(57) ABSTRACT

A water purification system for an ornamental aquarium is easily assembled as either a canister or a hang-on-back type model with a water tank or aquarium without compromising with an aesthetic appearance and low noise. The filtration element includes filtration blocks connectible in series for function and can be disassembled into a plurality of blocks that are reassembled to form the canister model and the hang-on-back model with a secure positioning feature.

3 Claims, 19 Drawing Sheets

(51) Int. Cl.
*C02F 3/30* (2006.01)
*C02F 3/12* (2006.01)
*C02F 1/00* (2006.01)
*B01D 29/56* (2006.01)
*B01D 35/30* (2006.01)

(52) U.S. Cl.
CPC ............... *C02F 3/06* (2013.01); *C02F 3/121* (2013.01); *C02F 3/30* (2013.01); *B01D 2201/30* (2013.01); *B01D 2201/301* (2013.01); *C02F 2201/006* (2013.01); *C02F 2203/006* (2013.01)

(58) Field of Classification Search
USPC .................... 210/167.22, 167.25, 167.27
See application file for complete search history.

(56) References Cited

U.S. PATENT DOCUMENTS

| | | | |
|---|---|---|---|
| 5,728,293 A * | 3/1998 | Guoli | A01K 63/045 210/903 |
| 6,210,567 B1 * | 4/2001 | Takada | A01K 63/045 210/167.22 |
| 10,486,092 B2 * | 11/2019 | Himes | B01D 35/30 |
| 2006/0049086 A1 * | 3/2006 | Axelrod | A01K 63/045 210/167.22 |
| 2008/0185323 A1 * | 8/2008 | Kargenian | C02F 9/005 210/117 |
| 2011/0290708 A1 * | 12/2011 | Renoud-Grappin | A01K 63/045 210/232 |
| 2018/0263224 A1 * | 9/2018 | Bresolin | A01K 63/045 |
| 2021/0060465 A1 * | 3/2021 | Wallace | B01D 29/333 |

FOREIGN PATENT DOCUMENTS

JP 2002143887 5/2002
WO WO 2014/184948 11/2014

OTHER PUBLICATIONS

JP 2019-111260, Office Action Response dated Sep. 30, 2019, 4 pages—Japanese, 5 pages—English.
JP 2019-111260, Notice of Allowance dated Nov. 28, 2019, 3 pages—Japanese, 3 pages—English.
JP 2019-111260, Amendment dated Nov. 28, 2019 3 pages—Japanese, 4 pages—English.

* cited by examiner

WATER PURIFICATION SYSTEM AND FILTRATION BLOCK

CROSS REFERENCE TO RELATED APPLICATIONS

This application relates to, and claims priority from, JP2019-34637 filed Feb. 27, 2019, the entire contents of which are incorporated herein by reference.

This application relates to, and claims priority from, JP2019-111260 filed Jun. 14, 2019, the entire contents of which are incorporated herein by reference.

FIGURE SELECTED FOR PUBLICATION

FIG. 1

BACKGROUND OF THE INVENTION

Field of the Invention

The present invention relates to a water purification system (device, apparatus) to purify water in an aquarium and clean the inside of the aquarium during a use.

Description of the Related Art

Conventionally, a filtration device that filtrates water in an aquarium, in which ornamental fish are kept, and a water purification system for the same are being used. A water filtration method includes a mechanical (physical) filtration that adsorbs water contaminants and a biological filtration that purifies water utilizing the action of bacteria. The device for purifying water in the aquarium by filtration includes the device having the filtration element outside the aquarium or inside the aquarium, which is functional to filtrate, is known and each device has the features respectively. The device having the filtration element set up outside the aquarium includes a standing type canister (floor-type or under-aquarium called an external filtration also), which is set up under and outside the aquarium (including such as a specialized rack, a table, a base and a floor), and hang-on-back-or-fixed type supported on the external wall of the aquarium (called an external-hanging filter).

The type of the aquarium, capacity of the filtration element, the material of the filtration element are selected based on the size of the aquarium (i.e., an amount of aquarium water), the size, kind and number of ornamental fishes in the aquarium, easiness of maintenance, and so forth, and such items are selected by the user.

In general, the hang-on-back model is compact and smaller than the canister model, but the filtration element and even contamination of the outside and inside of the filtration element with grime are seen through the aquarium, so that the aesthetic appearance thereof is very poor. When the appearance thereof is important, even for a small aquarium, the canister model is preferable, but the canister model may be likely over-engineered and the size remains detrimentally bulky. For an ornamental fish aquarium at home or in a relatively small location, it is expected that the filtration element is compact.

The purpose of the patent document 1 is to provide a filtration device for aquarium water of ornamental fishes, of which filtration materials are easily cleaned and replaced and the size thereof can be smaller.

The Patent Document 1 discloses a filtration device comprising: a housing having a main unit (case), of which the top end is open, and a lid that covers the opening of the main unit; a partition wall that divides the housing into a plurality of vertical filtration element chambers; and a plurality of filtration element housing boxes that are detachable from the plurality of filtration element chambers and houses individually plural kinds of filtration material, wherein water in the aquarium flows from the top board to the bottom board of the filtration element housing box through the water channel hole installed at both top board and bottom board of the filtration element housing box and then the water flows from the bottom board to the top board as alternately and in a zig-zag mode.

The filtration device of the Patent Document 1 has an advantage, wherein the section area of the filtration element housing box and the filtration material relative to the flowing water can be small and the passing distance of water through the filtration element is longer, so that the device can be smaller and thinner without compromising with the cleaning power for water. In addition, the filtration material is covered by the case so as not to see the filtration material therein-inside and the case is hanged externally on the back-side wall of the aquarium, so that the ornamental fish can be seen without compromising with an aesthetic aspect.

The Patent Document 2 and the Patent Document 3 disclose a water cleaning method and device in which the long, narrow and closed water passage comprises a plurality of cylinders that are connected alternately with each other between one side from the center of the cylinder and the other side thereof in the longer direction of the cylinder to form a zigzag water passage. According to the Patent Document 2 and the Patent Document 3, the container housing the filtration material is not a box as described in the Patent Document 1, and instead, are cylinders, which are connected with each other. According to the Patent Document 2, eight cylinders are connected in series and each filtration element inside the cylinder is crafted so that one cylinder at the inlet side of water passage is a mechanical filtration element and another cylinder at the outlet side thereof is a biological filtration element containing anaerobic bacteria, and six cylinders in-between are biological filtration elements containing aerobic bacteria. According to such a composition, the device and method capable of providing an action by which water is continuously cleaned (purified) to be near neutral in a single device for a long time is provided by denitrification with the anaerobic bacteria. In addition, it is advantageous that the long and narrow passages is formed as a zigzag aspect, in which cylinders are connected, so that an occurrence of so called channel phenomenon, by which water locally flows in the specific region of the filtration element material, can be minimized and also, a replacement of a filtration material is facilitated and further the device can be minimized.

The above conventional technical aspects are being a part of the present specification.

RELATED PRIOR ART DOCUMENTS

Patent Document

Patent Document 1: JP Patent Published 10-80237
Patent Document 2: JP Patent Published 2002-143887 A1
Patent Document 3: PCT International Publication WO2014/184948

ASPECTS AND SUMMARY OF THE INVENTION

Objects to be Solved

The water purification device applying the technology according to Patent Documents 1-3 can be smaller and thinner. In addition, either box or cylinder (column) types housing a filtration material is a cartridge having the identical specification, so that an exchange of the filtration material (filter) is easily carried out and a suitable number of cylinders is connected in series, so that the length of the passage, inside which water subjected to be cleaned passes through, can be adjusted (refer to such as paragraph [0015] in Patent Document 3). Therefore, in association with the size of the aquarium, the filtration capability and the size of the water purification device can be arbitrarily optioned and as a result, an over-engineered specification can be avoided.

However, conventionally, the canister and the hang-on-back have been available independently as respectively different models, and none of filtration model that is compatibly applicable to both canister and hang-on-back water purification system is known. For example, the water purification device of Patent Document 1 (particularly, referring to FIG. 1, FIG. 2 therein) is the filtration device (water purification system) which accommodates with the length of the long-side of the back-wall of the rectangular aquarium and is a box-like filtration device that is wide and thin, and such a device is designed to hang on the external wall of the aquarium, so that the device is unstable and falls down providing standing as the thin box as-is. In addition, relative to the hang-on-back water purification system according to Patent Document 2, 3 as set forth above, the grime and the filtration material housed inside of the water purification device can be seen through the aquarium, so that the aesthetic aspect of the aquarium may be lost.

The present invention has been completed to improve such a condition, and the purpose of the present invention is to provide a water purification system (device) for an ornamental fish aquarium, which can be easily assembled as either canister or hang-on-back model depending on the user's desire without compromising with the aesthetic aspect.

Means for Solving the Problem

A water purification system, according to the present invention, that purifies water subject to be cleaned, comprises: a filtration element that disassembles to a plurality of filtration blocks that are connectible to each other in series appearance-wise and water-passage-wise and reassembles to form at least one model selected from a group consisting of a canister model and a hang-on-back model, wherein each filtration block further comprises a filtration main unit that comprises a housing that includes a filtration material housing element that comprises two openings at each of said material housing element, which is connectible to external element and attachable to and fixable on an external wall of an aquarium; a filtration unit cover that covers at least a side surface of the filtration material housing of the filtration main unit; and an appearance of an overall device is an approximately rectangular parallelepiped.

The substantial feature of the present invention is that the filtration element, which is conventionally a single box, is divided into blocks so as to be easily handled as convertible either thin or thick model as a whole, and then that such respective blocks can be connected with each other in series appearance-wise and water-passage-wise.

A filtration block of the present invention comprises: a filtration material housing that filtrates water to be cleaned; a filtration material housing element, that comprises two openings at each top-ends of the filtration material housing, which is connectible to the external element and attachable to and fixable on an external wall of an aquarium; a filtration unit cover that covers at least a side surface of the filtration material housing of the housing of the filtration main unit; and an appearance of an overall device is an approximately rectangular parallelepiped.

The filtration material housing element of the housing of the filtration main unit of the filtration block has a structure so that an even number of cylinders (columns) is inserted one by one into an inside thereof in a perpendicular direction, wherein said each cylinder comprises a portion at top and bottom thereof, through which water passes but the filtration material does not pass; the passage between the portion the opening set up at one top end of the filtration material housing element and a top of a first cylinder adjacent to such an opening, the passage between the bottom of an odd-numbered cylinder and the bottom of the even-numbered cylinder in the opposite side of the opening, the passage between the even-numbered cylinder and the top of the odd-numbered cylinder in the opposite side of the opening or the opening set up at the other top end of the filtration material housing element are respectively passages through which water runs; and each cylinder housing the filtration material is respectively inserted into the filtration material housing element to form a long, narrow and thin water passage having a zigzag aspect; and it is preferable that when the plurality of filtration blocks are connected with each other appearance-wise and water-passage-wise to be applied, the cylinder of the upstream side is for the mechanical filtration and the cylinder of the downstream side is for the biological filer with an anaerobic bacteria and the middle cylinders in-between are the biological filtrations with an aerobic bacteria.

Specifically in the other words, when the filtration material housing element of the housing of the filtration main unit of the filtration block has an inside structure so that four cylinders are housed inside thereof, respective water passages are in between the opening set at one top of the filtration material housing element and a top of a first cylinder, in between a bottom of the first cylinder and a bottom of the second cylinder, in between a top of the second cylinder and a top of a third cylinder, in between a bottom of the third cylinder and a bottom of the fourth cylinder, and in between a top of the fourth cylinder and the opening at the other end of the filtration material housing element. When the six cylinders are used, respective water passages are in between the opening set at one top of the filtration material housing element and a top of a first cylinder, in between the bottom of the first cylinder and the bottom of the second cylinder, in between the top of the second cylinder and the top of a third cylinder, in between the bottom of the third cylinder and the bottom of the fourth cylinder, and in between the top of the fourth cylinder and the top of the fifth cylinder, in between the bottom of the fifth cylinder and the bottom of the sixth cylinder and in between the top of the sixth cylinder and the opening at the other end of the filtration material housing element.

Such a plurality of filtration blocks is extensively arranged in the longer direction so that the appearance thereof becomes thin as a whole by connecting appearance-wise and water-passage-wise to form the hung-on-wall model for the water purification system.

In addition, such a plurality of filtration blocks is extensively arranged in the shorter direction so that the appearance thereof becomes thicker by connecting appearance-wise and water-passage-wise to form the canister model for the water purification system.

In addition, the filtration block of another aspect of the present invention comprises a plurality of filtration main units having the housing in which a filtration material housing element, of which both ends has an opening (total is two) connectible to external element and is attachable to and fixable on an external wall of an aquarium; and a lower-portion cover having an opening at the top end, in which the plurality of filtration main units stands so that each opening faces upward and in addition, are so as to be capable of being housed in the direction as increasing the thickness thereof. One or a plurality of filtration blocks according to such an aspect is extensively arranged and connected water-passage-wise to form the canister model for the water purification system.

Effects of the Present Invention

The present invention can provide a water purification system (device) and a filtration block for an ornamental fish aquarium, which can be easily assembled as either canister or hang-on-back model without compromising with an aesthetic aspect.

The above and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
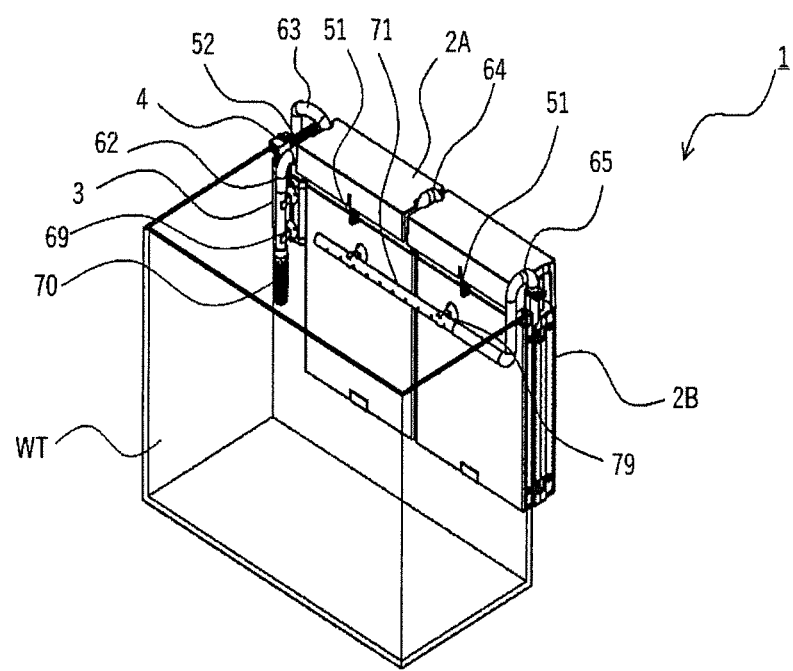
FIG. 1 is a perspective view illustrating a configuration of an aquarium including the aquarium from the side of non-attached filtration block when a water purification system according to an aspect of the present invention is applied to a hang-on-back model.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent.

It will be further understood by those of skill in the art that the apparatus and devices and the elements herein, without limitation, and including the sub components such as supports, locks, detents, filters, supports etc. operational structures, pipes, valves, batteries, any necessary driving elements, sensors, detectors, processors and any combinations of these structures etc. as will be understood by those of skill in the art as also being identified as or capable of operating the systems and devices and subcomponents noted herein and structures that accomplish the functions without restrictive language or label requirements since those of skill in the art are well versed in related water purification systems and filtration blocks and technologies of related purification devices and all their sub components, including various combinations of element without departing from the scope and spirit of the present invention.

Although only a few embodiments have been disclosed in detail above, other embodiments are possible and the inventors intend these to be encompassed within this specification. The specification describes certain technological solutions to solve the technical problems that are described expressly and inherently in this application. This disclosure describes embodiments, and the claims are intended to cover any modification or alternative or generalization of these embodiments which might be predictable to a person having ordinary skill in the art.

Hereafter, referring to FIGS. 1-19, the inventor illustrates the best mode of embodiments and adaptive embodiments of the present invention.

Figure 2:
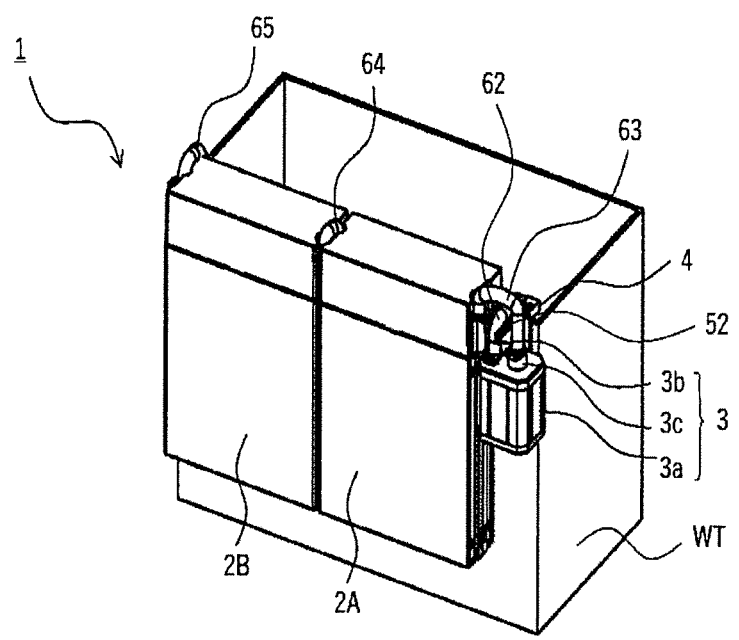
FIG. 2 is a perspective view illustrating an aquarium including the aquarium from the other side (filtration block hanging side) in FIG. 1 when a water purification system according to an aspect of the present invention is applied to a hang-on-back model.
Figure 5:
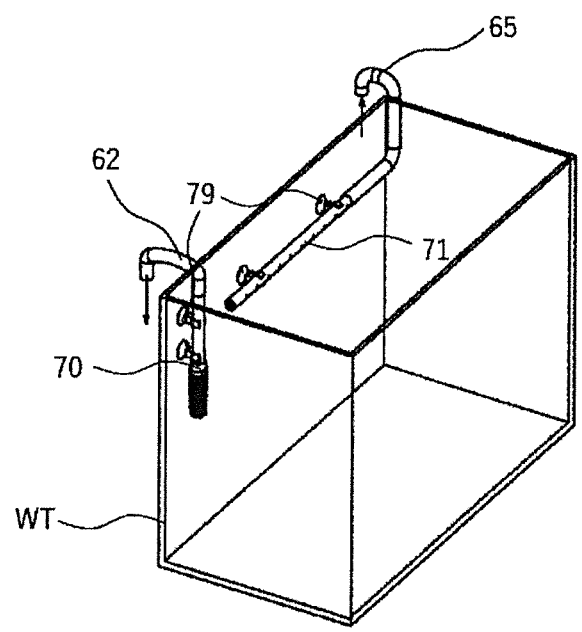
FIG. 5 is a perspective view illustrating a unit set up inside the aquarium when a water purification system according to an aspect of the present invention is applied to a canister model.
Figure 6:
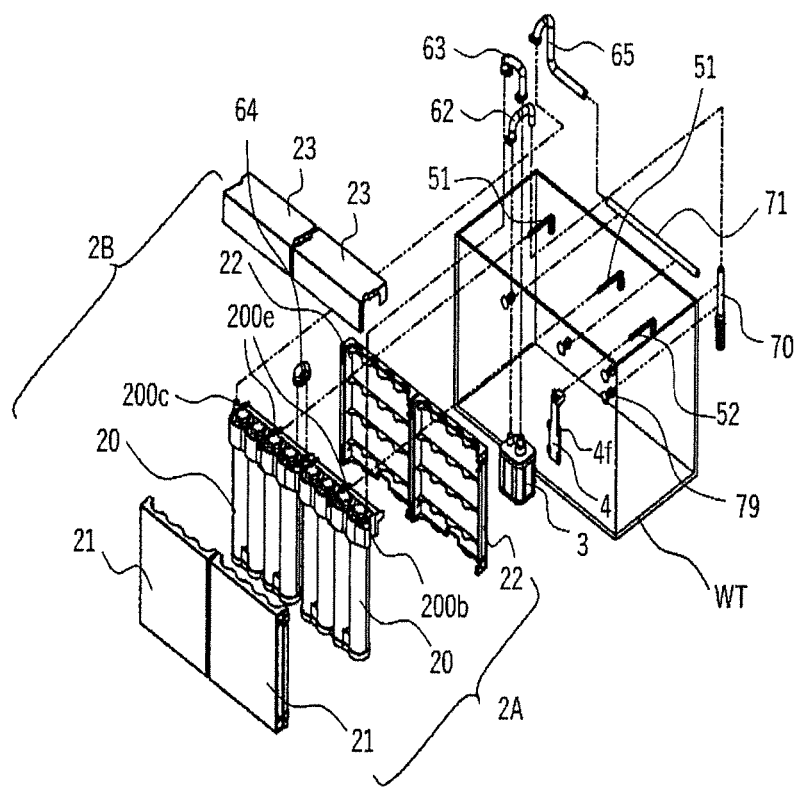
FIG. 6 is a view illustrating a detail development of the water purification system when the water purification system according to an aspect of the present invention is applied to a hang-on-back model.

One example of the present invention is water purification system 1 and/or a filtration block 2 (shown as 2A, 2B) in which the width of the water tank (WT) shown here as a rectangular aquarium is 60 cm and is of a common shape used in a home or with ornamental fish. The water purification system 1 according to the present invention is applied to either a hang-on-back model referring to FIGS. 1, 2, 6, or a canister model referring to FIGS. 3, 4, 5, 7. The filtration blocks 2, 2A, 2B have the same configuration and structure as illustrated in FIGS. 1, 2, 6 and hereinafter and referred simply as "filtration block 2" unless necessary to be specifically separated. In addition, for convenience, such a filtration block is called a first filtration block and a second filtration block (respectively 2A, 2B) in order from the upstream side of the flow of the water to be cleaned. In addition, for convenience sake, the layout (mainly arrangement of the respective filtration blocks) of the water purification system may be called a first layout applied to the hang-on-back model and the layout (mainly arrangement of the respective filtration blocks) of the water purification system may be called a second layout applied to the canister model.

Referring to FIGS. 1-19 according to one aspect of the present invention selected technical features of the water purification system 1 are that system 1 is able to be reassembled between the hang-on-wall model and the canister model, that the filtration element(s) having a function for filtrating water to be cleaned are able to be assemble-able (compatible) into a thin model or a thick model as a whole, that the system 1 can be broken down into elements and units so as to be easily handled, and that such respective blocks are connectible appearance-wise and water-passage-wise and in series.

Specifically, when applied to the hang-on-wall model, i.e., the first layout, referring to FIGS. 1, 2, 6, a plurality of filtration blocks 2, 2A, 2B is respectively connected to form the thin model as a whole filtration element, i.e., arranged extensively in the longer direction appearance-wise as well as water-passage-wise. Specifically, when applied to the canister model, i.e., the second layout, a plurality of filtration blocks 2, 2A, 2B is respectively connected to form the thick model as a whole filtration element so as to be stable on the ground (floor), i.e., arranged extensively in the shorter (lateral) direction appearance-wise as well as water-passage-wise. In addition, the configuration per se of the filtration block 2 (the detail of such a configuration is described later) is one of technical features of the present Embodiment.

In either case of the hang-on-back model or the canister model, as shown in FIGs., the water purification system 1 comprises filtration blocks 2A, 2B, a pump 3, water communication elements 62 to 65, as components set up outside an aquarium. However, a part of the connection elements 62 to 65 is set up inside the aquarium as later set forth. Parts set up inside the aquarium include a strainer 70 and a shower piping 71. The strainer 70 that is set up in the side of water inlet to block solid materials inside the aquarium and allows water to pass through can be a commonly available part. The shower piping 71 that is a water passage to exit the purified water by filtration into the aquarium can be commonly available.

Figure 3:
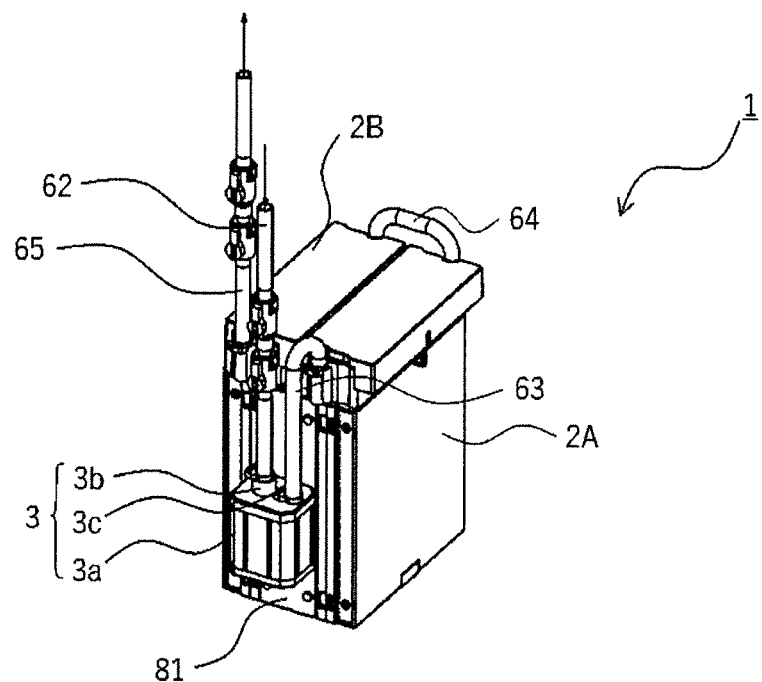
FIG. 3 is a perspective view illustrating a configuration of the filtration block set up outside the aquarium from the pump-side when a water purification system according to an alternative aspect of the present invention is applied to a canister model.

The pump 3 suctions water-to-be-cleaned, passing through the strainer 70, to be cleaned in the aquarium and provides the first filtration block 2A with water-to-be-cleaned through the water communication element 62. Referring to FIG. 3, the pump 3 comprises a pump main unit 3a, a water intake 3b and a water exit 3c. The pump 3 can be arbitrarily selected based on the electric power specification and the required suction power. The required suction power is determined based on such as the length of the water passage through which water-to-be-cleaned is sucked. As set forth later, when the total eight cylinders, including four cylinders of each filtration block in the two filtration blocks, the maximum lifting range is preferable approximately 2 m. When four cylinders of each filtration block in the three filtration blocks (total twelve cylinders), are connected in series, the maximum lifting range is preferable approximately 2.8 m.

The water communication element 62 that is a piping connects the strainer 70 and the pump 3, and water passes through therebetween, the water communication element 63 that is a piping connects the pump 3 and the first filtration block 2A, and water passes through therebetween, the water communication element 64 that is a piping connects the first filtration block 2A and the second filtration block 2B, and water flows through therebetween. The water communication element 65 that is a piping connects the second filtration block and the shower piping 71, and water flows through therebetween. The water communication elements 62 to 65 may include the connection element between piping referring to FIGS. Structures, including length, diameter and size and material of the water communication elements 62-65 can be arbitrarily arranged in accordance with such as the place to be set up.

When used as the hang-on-back model, the water purification system 1 further comprises an approximately L-shaped fixing element 52 and an approximately plate-like fixing element 52 having hooks 4f at four locations in addition to the common components. As set forth later the fixing element 4 and the fixing element 52 are used to fix the pump 3 to the top portion of the external wall of the aquarium. However, the shape and fixing method of such fixing elements is an example and not limited to one illustrated in FIGS. 1-19.

Figure 4:
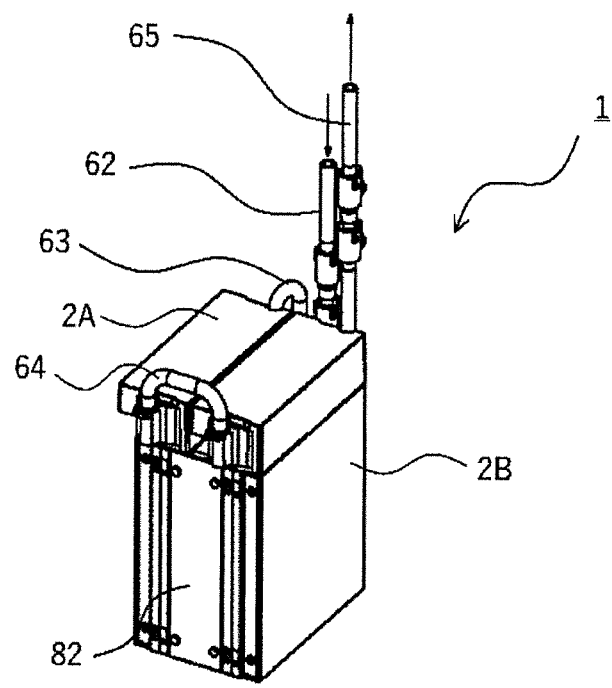
FIG. 4 is a perspective view illustrating a configuration of the filtration block set up outside the aquarium from the opposite side in FIG. 3 (no-pump-side) when a water purification system according to an alternative aspect of the present invention is applied to a canister model.
Figure 7:
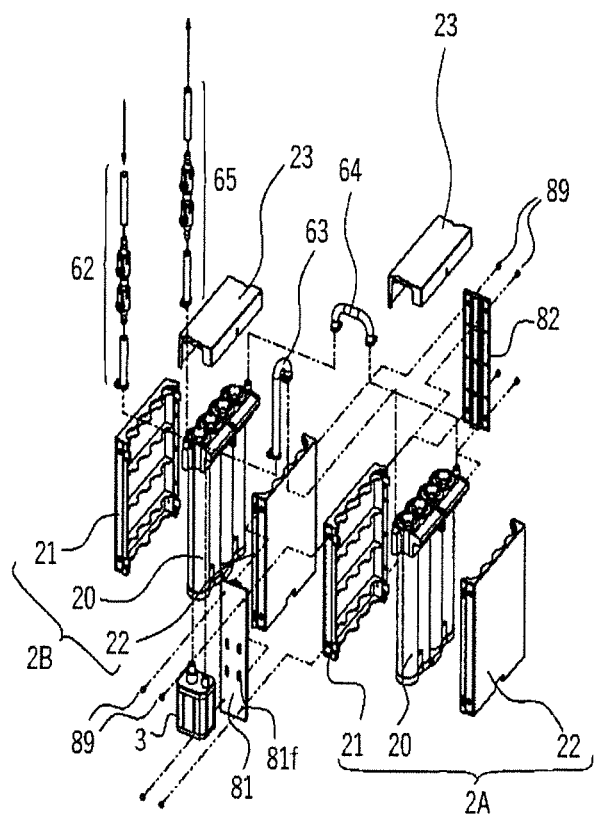
FIG. 7 is a view illustrating a detail development of the water purification system when the water purification system, according to an aspect of the present invention, is applied to the canister mode.

When used as the canister model, the water purification system 1 further comprises a connection plate 81 and a connection plate 82 as illustrated in FIG. 3, FIG. 4 and FIG. 7 in addition to the common components. The connection plate 81 comprises hooks that fix the respective filtration blocks 2 in the thickness direction and mount the pump 3. The connection plate 82 is used to fix the respective filtration blocks 2 in the thickness direction. However, the method to arrange and fix a plurality of respective filtration blocks 2 in the thickness direction and the method to mount and fix the pump 3 are one of examples and not limited thereto. For example, such as elastic band, tape and hook, which can be available in general, can be used arbitrarily for fixing.

Figure 18:
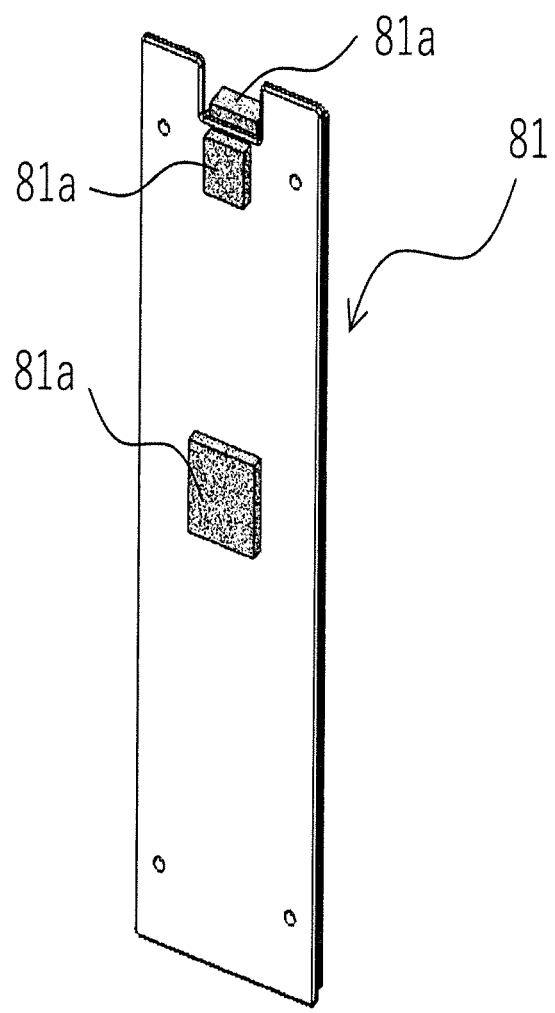
FIG. 18 is a schematic view illustrating the front surface of the connection plate 81 of another alternative aspect of the present invention.
Figure 19:
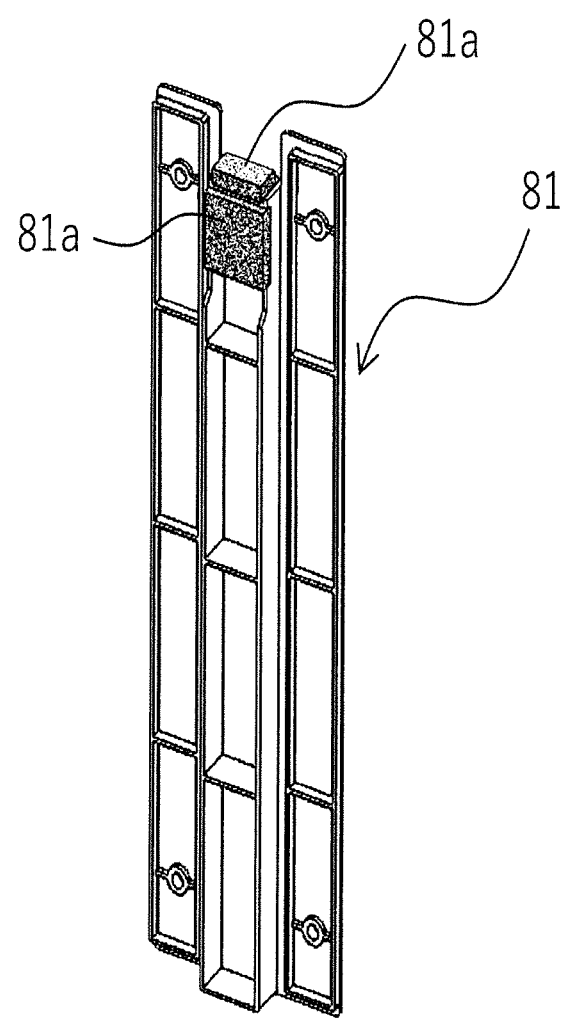
FIG. 19 is a schematic view illustrating the back surface of the connection plate 81 of another alternative aspect of the present invention.

In addition, with respect to a preferable aspect of the connection plate 81 as referred to illustrated in FIG. 18 and FIG. 19, the front face of the connection plate 81 is flat without a hook 81f as illustrated in FIG. 7. and has a concave element enabling hanging a pump fixing element 4 to the top portion of the connection plate 81, and a vibration dampener 81a can be attached on a plurality of locations of front-back both sided of the connection plate 81. Specifically, the pump fixing element 4 and the connection plate 81 can be combined while sandwiching the vibration dampener 81a to fix the pump 3 without contacting each other. In such a way, it is preventable that vibration of the pump 3 reaches the connection plate 81 and the filtration element cover and resonates each other to make noise loudly. The example of the vibration dampener 81a may include, for example, a viscoelastic material and an anti-seismic gel. When applied to the canister model, suction power required by the pump is bigger than that when applied to the hang-on-back model, so that the vibration sound tends much louder and in addition, vibration of the pump reaches easily the connection plate 81 and the cover of the filtration element, so that provided arbitrarily adhering the vibration dampener 81a to both sides of the connection plate 81, the noisy sound due to vibration of the pump can be beneficially reduced.

(Configuration of the Filtration Block 2)

Next, referring to FIGS. 8-11, the inventor set forth the configuration of the filtration block 2.

Figure 8:
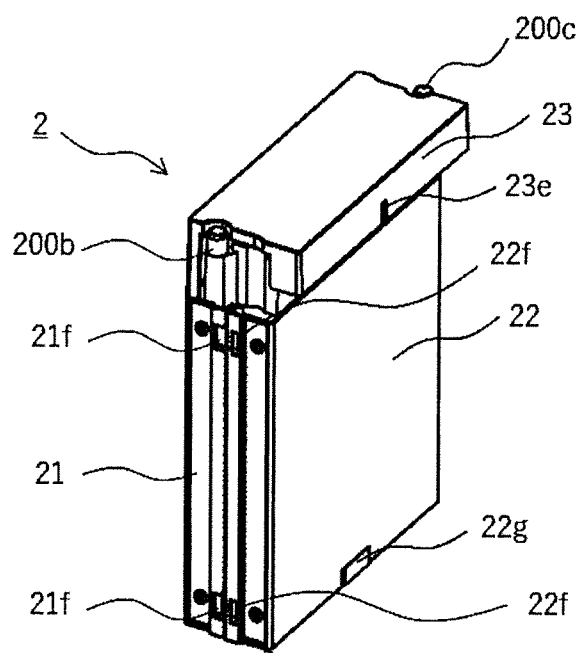
FIG. 8 is a perspective view illustrating an external configuration of a single filtration block according to an aspect of the present invention.

The filtration block 2 functions to provide filtration and is a block (unit) to be connectible water-passage-wise with an external element (device) such as the pump 3, the shower piping 71 and the other filtration block 2 through the connection element. Referring to FIG. 8, the filtration block 2 is an approximately rectangular parallelepiped as a whole and connectible appearance-wise and structure-wise with each filtration block 2.

Figure 10:
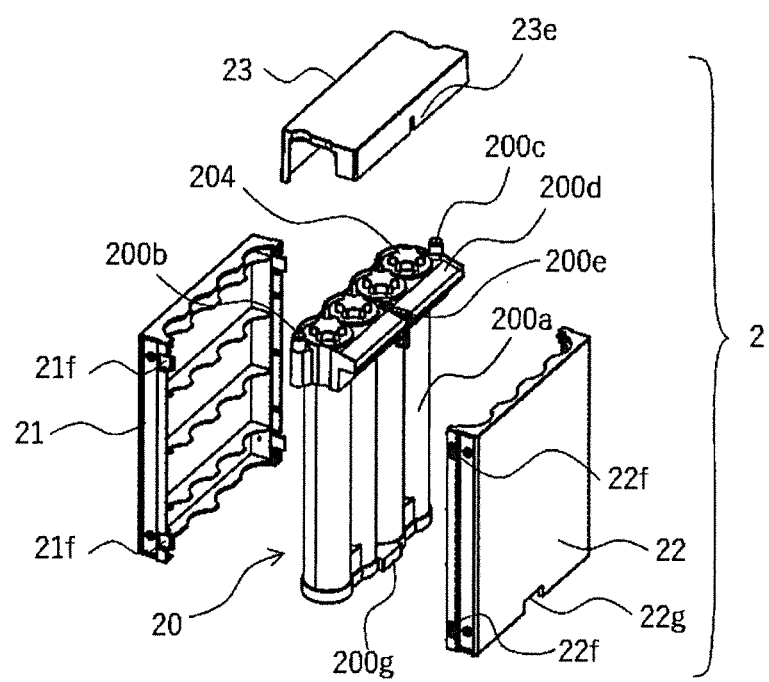
FIG. 10 is a view illustrating a detail development according to an alternative aspect of the present invention as a single filtration block.

Referring to FIG. 10, the filtration block 2 comprises a filtration main unit 20, a first side-cover 21 of the filtration unit, a second side-cover 22 of the filtration unit and a top-cover 23 of the filtration unit. Hereinafter, the side-cover 21, 22 of the filtration unit may be called shortly the side-cover 21, 22 or collectively the bottom-cover of the filtration unit in case. The top-cover 23 of the filtration unit may be called shortly the top-cover 23. In addition, such a cover may be called collectively a filtration cover 21-23 or simply a cover 21-23.

The opening 200b, 200c formed at both top-ends of the filtration main unit 20 is for connecting with the external devices though the communication element and one top-end is a water intake (water inlet) and the other top-end is a water exit (water outlet). Referring to FIG. 8, the opening 200b, 200c are exposed to outside of the cover 21, 22, 23. Specifically, the opening 200b, 200c respectively corresponding to the intake and the water exit are exposed in the filtration block 2 in the state in which the cover 21-23 is covering the filtration main unit 20, so that the filtration block can connect with the external devices water-passage-wise through the connection element.

(Configuration of the Filtration Main Unit 20)

The filtration main unit 20 is the main unit of the filtration element that filtrates water-to-be-cleaned. First, the inventor sets forth an external appearance (form) thereof and then the inside thereof.

Figure 12:
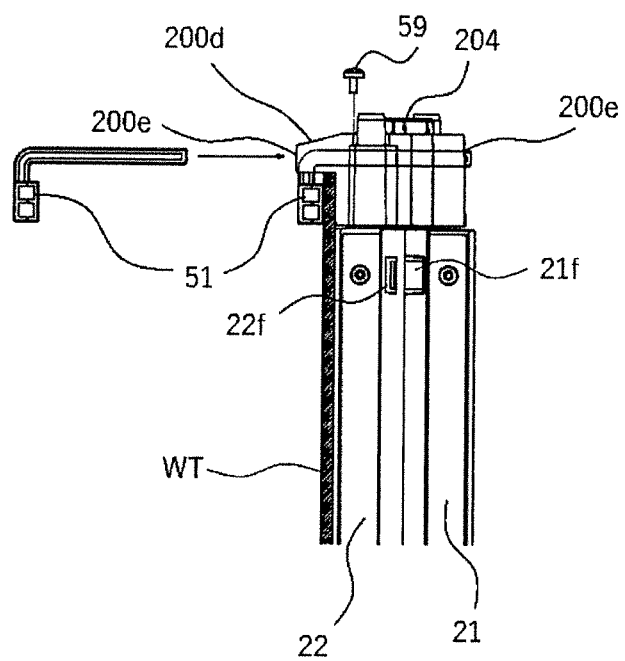
FIG. 12 is an explanation and magnified view, for easy understanding, illustrating the configuration without the cover, in which the filtration block is hung on the aquarium and fixed thereto when the water purification system is applied to the hang-on-back model.
Figure 13:
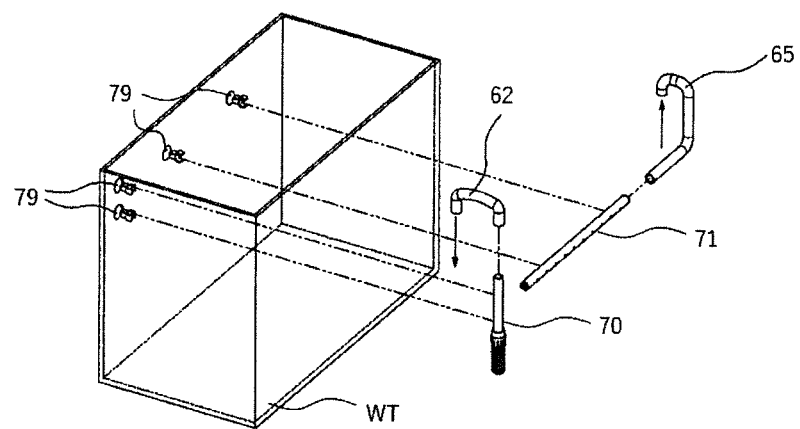
FIG. 13 is a detail development of the configuration corresponding to FIG. 5.
Figure 14:
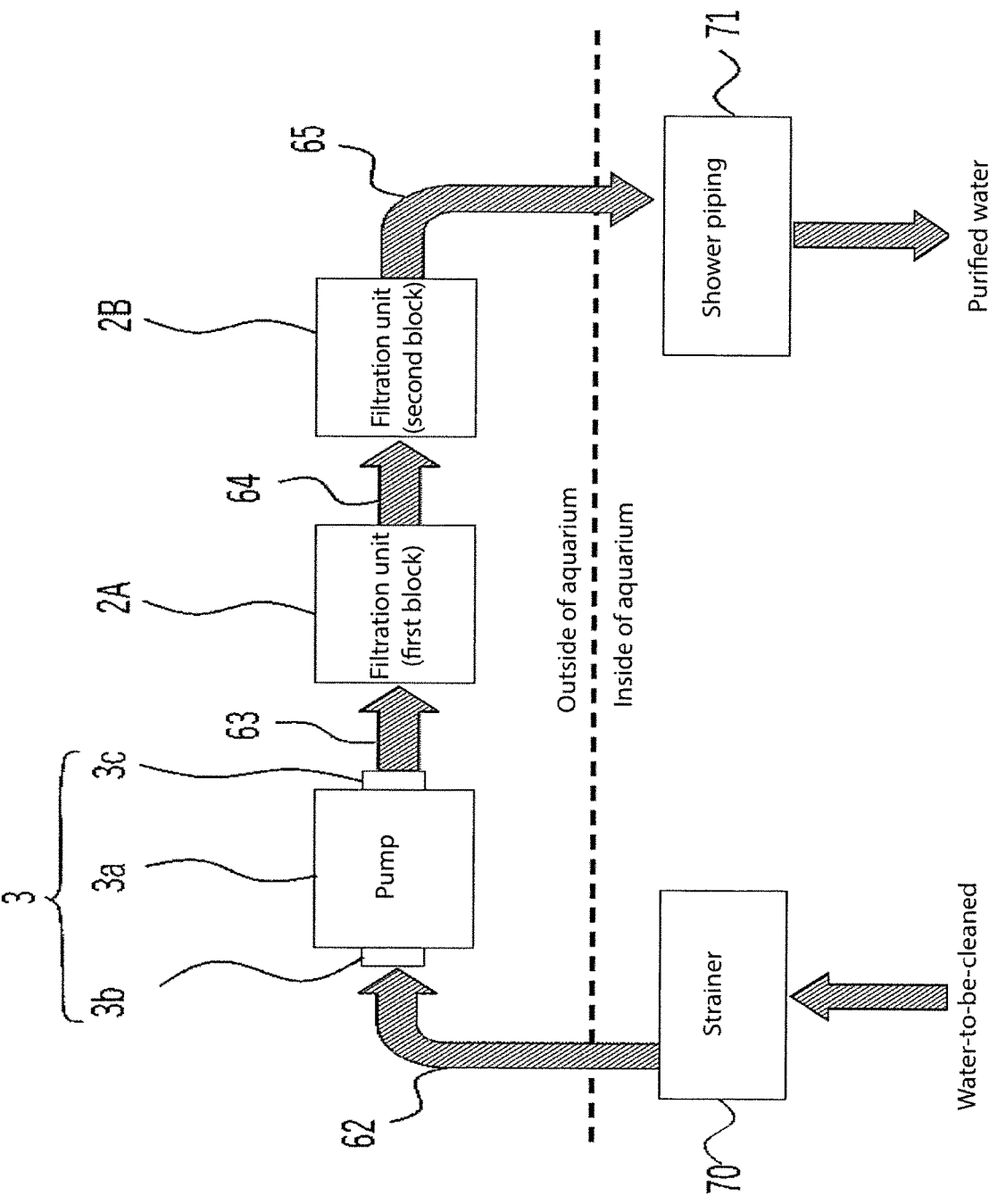
FIG. 14 is a schematic and supplemental view explaining the functional configuration as the water purification system and the flow of water to be cleaned according to an aspect of the present invention.

The filtration main unit 20 comprises the housing 200 having a filtration material housing 200a that houses the filtration material thereinside and the lid 204. The openings 200b, 200c connectible with the connection element (piping) are formed at both top-ends of the housing 200. One of openings 200b, 200c works as the water intake and the other one works the water exit based on the connection aspect. Referring to FIGs., the filtration material housing element 200a of the housing 200 has an external form allowing four cylinders 201, housing the filtration material, to be inserted individually and the ratio of the width to the depth thereof is approximately 4 to 1 to make a thin model. Referring to FIGs., the convex (projection) portion 200d having an approximately inverted L-shaped lower portion is formed along the edge of one side of the housing 200 in the longer direction. Such a convex portion 200d allows the housing 20 to hang on the external wall of the aquarium and be fixed thereto, and is exposed from the side-cover 22 of the filtration unit, referring to FIG. 9. A through-hole 200e to pass the L-shaped fixing element 51 is formed at the center of the convex portion 200d. Referring to FIG. 12, accordingly, such a convex 200d is connected to the edge portion of the external wall, the fixing element 51 is inserted into the through-hole 200e, and fixed with a screw 59, so that the housing 20 can be fixed to the external wall of the aquarium. In addition, referring to FIG. 1, not only when fixed to the external wall, but also when, referring to FIG. 3, FIG. 7, not fixed to the external wall (as a canister), the fixing element 51 should be inserted into the through-hole 200e during use. In such a way, a fixing element 51 can be prevented from a missing (loss) and when the housing main unit 20 is expected to be fixed to the external wall, the fixing element 51 is always available for fixing.

Figure 11:
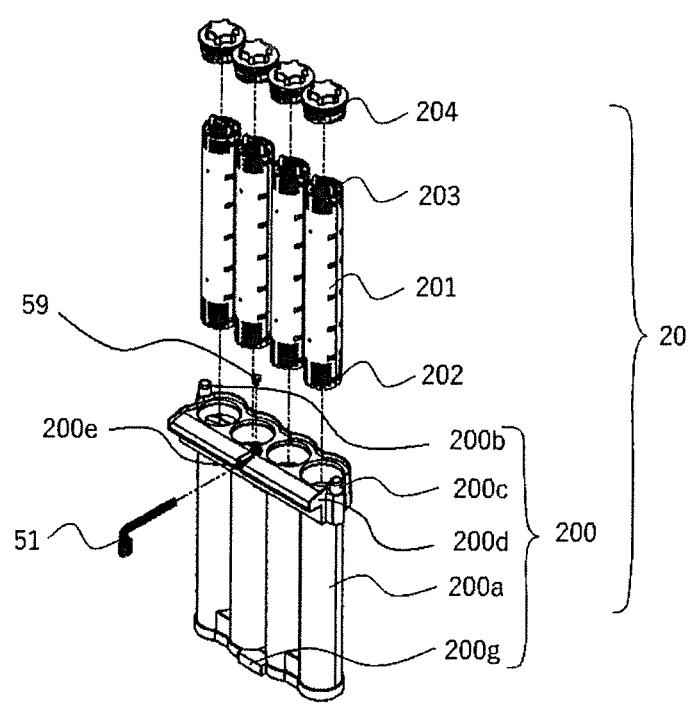
FIG. 11 is a view illustrating a detail development according to an aspect of the main filtration unit as an example of the inside configuration of the filtration block.

Referring additionally now to FIGS. 10 and 11, the connection elements, inside which water flows, are formed at the lower portion of the cylinder housing 200a between the farthest left and the second farthest left and the third farthest left and the fourth (last) farthest left of the housing 200. Although it is hardly visible in FIGS. 10 and 11, the other connection element, inside which water flows, is formed at the top-portion of the cylinder housing between the second farthest left and the third farthest left. In addition, no particular sign is provided as to the connection element in the housing 200.

The cylinder 201 is a filtration material cartridge that contains the filtration material thereinside and is easily replaceable one by one. Referring to FIGS. 10-11, the bottom-portion 202 and the top-portion 203 of the cylinder 201 are respectively blocking the filtration material but flowing-water. A size of the cylinder 201 is not particularly limited, but the cylinder houses the filtration material inside thereof, so that the size thereof is as large as a necessary amount of filtration material can be well housed so that water-to-be-cleaned flows smoothly. The filtration material to be housed can be selected arbitrarily in accordance with a purpose.

As set forth above, with respect to the housing 200, four cylinders 201 housing each filtration material thereinside are inserted, the respective lids 204 are tightly closed and the openings 200b, 200c are connected to outside through the connection element, so that either one of openings 200b, 200c can be the water intake and the other can be the water exit so that the closed long-zigzag water passage can be formed.

According to such a configuration, the filtration main unit 20 is connectible with the pump 3, the shower piping 71, the other filtration main unit 20 through the connection element without the covers 21-23 and consequently, functionable as the filtration element once the filtration material fills inside thereof and connects with required elements such as the pump 3.

According to the internal configuration of the filtration main unit 20 as set forth above, the inventor sets forth that four cylinders 201, which houses each filtration material, are housed and the long, closed zigzag water passage can be formed. According to such an internal configuration, the long flow distance for water-to-be-cleaned passing the filtration material can be ensured and in addition, an occurrence of a channel phenomenon, i.e., in which water flows selectively through a specific portion of the filtration material, can be prevented, the filtration material can be effectively utilized, and the housing can be smaller and thinner. In addition, the filtration material housing elements are separated to a plurality of cylinders 201 and form one long zigzag water passage, so that each appropriate filtration material for lower stream, middle stream and upper stream of the water passage is distinguishable and housed easily and the better and attractive environment for multiplication of bacteria can be easily established.

However, the internal configuration of the filtration main unit is not limited to the aspect set forth above. For example, the configuration enables housing not only four cylinders, but also any even numbered cylinders, e.g., six and eight. Provided such a number is even, as set forth above, one opening of openings at both ends of the filtration main unit can be designated the water intake for water-to-be-cleaned and the other opening can be designated the water exit thereof and as a result, one narrow, long and zigzag water passage can be formed. In addition, a configuration in which the filtration material can be directly inserted into the housing which is not partitioned and is approximately a rectangular parallelepiped and lidded.

(Configuration of the Cover of the Filtration Element)

Referring to FIG. 10, the side-cover 21, 22 is the cover sandwiching the bottom portion (cylinder housing indicated by the sign 200*a*) of the filtration main unit 20 from both sides. As illustrated in FIGS. 6-10, the outside surface of the side-cover 21, 22 of the filtration element is flat and the inside surface thereof is the form along the side-surface of the cylinder housing 200*a*. The cover 21, 22 is fixed by connecting the hook 21*f*, 22*f*, which is mounted respectively at the four locations, one another. The side-cover 21, 22 of the filtration element has a flat external-surface, so that the filtration block 2 can be arranged in parallel as illustrated in FIG. 1-FIG. 4, In the illustrated Embodiment, the side-cover 21, 22 has the form as the bottom surface of the filtration main unit 20 is exposed when the filtration main unit 20 is covered from both sides. In such an aspect, when standing, the filtration main unit is stable, but such an exposure of the bottom-surface is not mandatory.

Referring to FIG. 6, the side-cover 22 is the side-cover that faces the aquarium when applied as the hang-on-back model. The side-cover 22 covers the cylinder housing 200*a* located at the side at which the convex element 200*d* of the filtration main unit 20 is present and it is structured so that the convex element 200*g* of the central bottom-portion of the cylinder housing 200*a* and the concave element of the side-cover bottom-portion of the side-cover 22 connect with one another. The external surface of the side-cover 22 is flat, so that the side-cover and the surface of the external wall of the aquarium can be coherent when hanged on the external wall of the aquarium.

The top-cover 23 is the cover that entirely covers the top-portion of the filtration main unit 20 from above so that the opening 200*b*, 200*c*, formed at both ends, are being exposed. The top-cover 23 is simply put on the upper portion of the filtration main unit 20 but not particularly fixed using such as a screw, so that mantling and dismantling the top-cover 23 are so easy that the inside condition of the filtration element can be easily recognized. Filtration is still functionable without the top-cover, but the contamination of the upper portion of the filtration main unit 20 can be prevented by mantling the top portion.

The top-surface of the too-cover 23 looks flat as illustrated in FIG. 6 but it is not mandatory to be flat. The top-surface of the top-cover is flat, so that contamination can be easily wiped off when contaminated.

Referring to FIG. 8, a connection groove 23*e* connectible with the fixing element 51 is formed at the central bottom portion of the top-cover 23, wherein the position thereof is corresponding to the through-hole 200*e* of the filtration main unit 20 while the top-cover is mantling. In such a way, the connection groove 23*e* is formed, the L-shaped fixing element 51 can be left with penetrating the through hole 200*e* of the filtration main unit 20 even when the filtration main unit 20 is not fixed to the external wall of the aquarium (i.e., loss of the fixing element 51 can be prevented), and just mantling the top-cover 23 of the filtration element from above prevents can advantageously prevents movement thereof from right to left.

Figure 9:
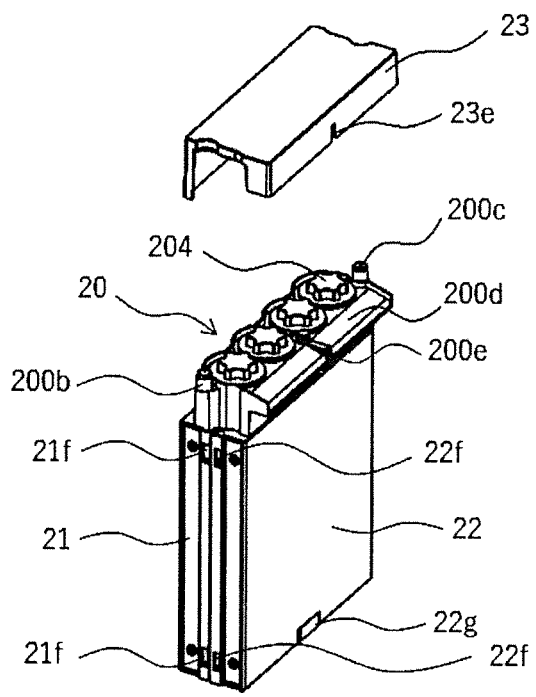
FIG. 9 is a perspective view illustrating a state in which the top-cover is removed from a single filtration block according to an aspect of the present invention.

Referring to FIGS. 1-4, FIG. 8, the filtration block 2 is applied under the condition in which the cover 21-23 mantles the filtration main unit 20, Referring to FIG. 8, when the entire covers are applied to mantle, the front surface of the side-cover 21 and the side surface of the top-cover 23 make structurally a unified flat surface, Specifically, referring to FIG. 9, when the top-cover 23 is removed, the side-cover 21 are projecting a little from the filtration main unit 20. By being mantled with the top-cover 23, the front surface of the side-cover 21 and the side surface of the top-cover 23 are unified to have a flat surface. Accordingly, referring to FIGS. 9-10, the filtration block 2 covered with all covers 21, 22, 23 makes the approximately rectangular parallelepiped, so that the respective filtration block 2 can be easily arranged in parallel. Here, referring to FIG. 9-10, the convex portion 200*d* side (side-cover 22 side) of the top-cover 23 projects by the amount as illustrated in FIG. 10 of the convex portion 200*d* of the filtration main unit, which is formed for hanging the filtration main unit on the outside of the external wall of the aquarium, so that the shape of the filtration block 2 is called an approximately rectangular parallelepiped instead just rectangular parallelepiped. However, referring to FIG. 12, the thickness of the convex portion 200*d* is more or less the same thickness of the external wall of the aquarium and more or less the same thickness of the L-shaped fixing element 51, so that it is called the approximately rectangular parallelepiped.

In addition, the cover 21-23 is made of an opaque material, so that the filtration main unit 20 is invisible from outside. No contaminated filtration material and water are invisible, so that the aesthetic appearance is not undermined. In addition, the cover 21-23 can be colored and/or figured arbitrarily. For example, when the cover 21-23 is dark-colored such as black and hanged on the outside of the external wall of the aquarium WT, referring to FIG. 1, and the ornamental fish is observed throughout the aquarium, the surface of the cover 22 looks as if a mirror and consequently, the ornamental fish can be observed as further beautiful. In addition, the cover 21-23 can be transparent, i.e., see-through, material allowing to see the inside unless harming the aesthetic appearance due to such a high-grade design feature. In addition, the cover other than the top-cover may not be separated to the side-cover 21 and 22, and instead, can be unified to mantle the bottom surface and of which the bottom surface can be flat and the shape can be like a box having opening top-end (lower-portion cover).

As set forth above, each filtration block 2 is an approximately rectangular parallelepiped, so that the thickness of the entire filtration element and the width thereof can be increased in parallel arrangement. At least, the bottom surface thereof is flat, so that the filtration element can be set as a canister model if an enough thickness is provided. Despite the approximately rectangular parallelepiped, the filtration element can be set on the external surface of the aquarium based on the structure as set forth later, so that the filtration element can be set in a parallel arrangement along the outside surface of the external wall of the aquarium as illustrated in FIG. 1 and FIG. 2. Referring to FIGS. 3, 4, the aspect of the filtration element can provide also easily the parallel arrangement in the direction in which the thickness thereof increases.

As set forth above, according to the aspect of the present Embodiment, the filtration element of the water purification system 1 is designed to form each block as the filtration block 2 which has the form facilitating parallel arrangement in both increasing thickness and width thereof, so that the aspect thereof can facilitate compatibility between the hang-on-back model and the canister model.

(Configuration, Assembly and Setting-Up when Used as the Hang-On-Back Model)

Next, the inventor arbitrarily sets forth configuration, assembly and setting-up when used as the hang-on-back model.

Referring to FIG. 1 and FIG. 2, when used as the hang-on-back model, two filtration blocks 2A, 2B are set up in the parallel arrangement as both sides thereof face one another in the shorter direction so as to extend in the longer direction, the connection element 64 connects the respective adjacent openings together, i.e., the opening 200c of the filtration block 2A and the opening 200b of the filtration block 2B. In such a way, the filtration element of the water purification system 1 can be built.

Next, such a filtration element, i.e., the connected filtration block 2A, 2B, is temporarily fixed at the adequate location of the edge of the top-portion of one outside (rear-side in FIG. 1) external wall of the aquarium WT. Referring to FIG. 12, a method for fixing the filtration block 2 includes a steps of: closely contacting the convex portion 200d, which is formed along the top-portion edge of the filtration main unit 20, to the top-end edge of the filtration main unit 20 of the aquarium WT and putting thereon; inserting the L-shaped fixing element 51 from the inside of the external wall of the aquarium WT to the through-hole 200e; and fixing the filtration block 2 with the screw 59 as sandwiching the external wall of the aquarium; under the condition in which the top-cover 23 of the filtration block 2 is removed. The top-cover 23 is put on at last following final fixing.

Next, the method includes steps of: putting the plate-like fixing element 4 to fix the pump 3 to the external wall of the aquarium on an adequate location of the top-portion (edge) of the external wall of the aquarium, i.e., the location where the connection element 63, connecting the water exit 3c of the pump 3 and one opening 200b of the filtration block 2A each other, is reachable so that the surface having the hook 4f is in the opposite side of the aquarium, and penetrating the L-shaped fixing element 52 into the through-hole formed on the fixing element 4 from the opposite side; sandwiching the external wall of the aquarium; and fixing temporarily. And the pump 3 is hanged on the hook 4f formed at four locations of the pump fixing element 4 and connecting the exit 3c of the pump 3 and one opening 200b of the filtration block 2A by the connection element 63. Once connected by the connection element 63, the pump fixing element 4 is fixed with the screw 59. In addition, as illustrated 4h in FIG. 16, a material, e.g., urethane, sponge and gel, that absorbs or reduces (bonded) vibration of the pump, is arbitrarily and preferably adhered a plurality of locations on the back-side of the pump fixing element 4 (aquarium side). In such a way, the propagation (reaching) of vibration of the pump to the aquarium can be alleviated. Accordingly, when used as a hang-on-back model, the portion of outside hanging portion of the aquarium is attached and fixed.

Next, such a method further includes steps of connecting the strainer 70 and the water intake 3b of the pump 3 by the connection element 62 and hanging a part of the strainer 70 and a part of the connection element 62 inside the aquarium. Then, the piping of the water intake side is completed. At the end, such a method includes steps of connecting the unconnected opening (200c) of the filtration block 2B and the shower piping 71 by the connection element 65, putting the shower piping 71 in the inner side of the external wall of the aquarium (inside the aquarium), and referring to FIG. 1, FIG. 2 and FIG. 6, fixing the shower piping 71 on the inner side of the external wall of the aquarium by e.g., the suction disk 79.

In such a way referring to FIG. 1, FIG. 2, the water purification system 1 as the hang-on-back model is assembled, wherein the respective filtration blocks are connected appearance-wise and water-passage-wise with each other, and the setting-up is completed.

In such a way, when used as the hang-on-back model, a plurality of filtration blocks 2 is rearranged so that the entire filtration element can be a thin model and set up along the outside of the opposite side external wall of the aquarium. Accordingly, when the ornamental fish is put inside the aquarium, nothing is present in the front-side of the aquarium so that the ornamental fish can be observed very well without any obstacle against a visual impression.

(Configuration, Assembly and Setting-Up when Used as the Canister Model)

Next, the inventor order sets forth configuration of the water purification system 1 to be assembled and set up when used as the canister model according to the aspect of the Embodiment.

FIG. 3 is a perspective view illustrating a configuration of the portion set up outside the aquarium viewing from the pump-side when the water purification system 1 according to an aspect of Embodiment of the present invention is applied to a canister model, FIG. 4 is a perspective view from the opposite side of FIG. 3 (non-pump side). FIG. 5 is the perspective view illustrating a configuration of the portion set up inside the aquarium when applied to a canister model.

Referring to FIG. 3 and FIG. 4, when used as the canister model, two filtration block 2A, 2B is set up in the parallel arrangement so that both sides thereof face each other the longer direction so as to extend in the shorter direction. Specifically, the filtration blocks are arranged and connected with each other so that the canister portion of the water purification system 1 can be a thick type (increasing the thickness). The filtration block, 2A, 2B is fixed by respectively screwing the connection plate 81, 82, The left-side, being viewed from the surface (right side of FIG. 3) having the convex portion 200d allowing to form a hang-on-back model for the filtration block 2A, is fixed by screwing the connection plate 81. Referring to FIG. 7, for example, the hook 81f allows to mount the pump is formed respectively at four locations on the connection plate 81. When the hook 81f is hung on the pump 3, so that the pump 3 is fixed on the connection plate 81. Referring to FIG. 4, the surface of the opposite side is fixed by screwing the connection plate 82. As illustrated in FIG. 7, the surface of the connection plate 82 is flat plane with nothing protruding.

Figure 17:
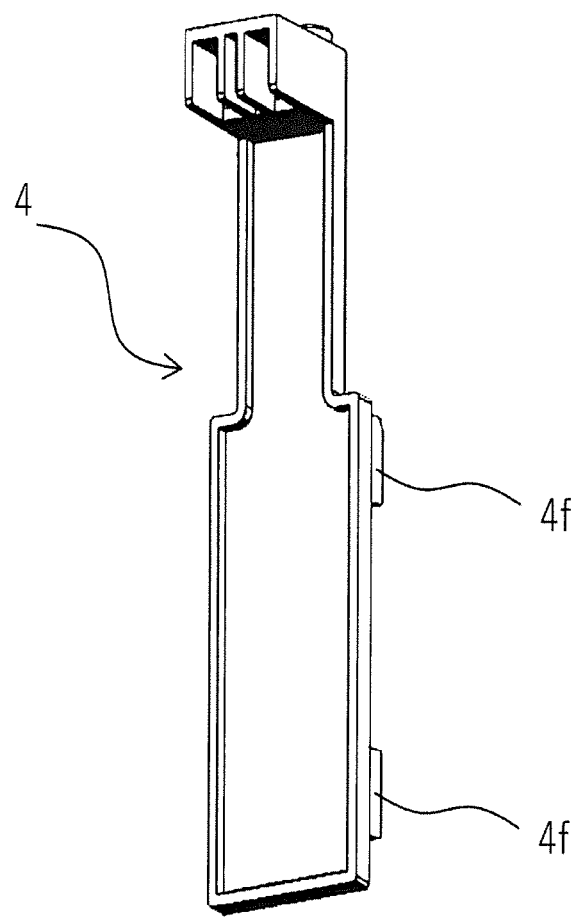
FIG. 17 is a schematic view illustrating the back surface of an aspect of the present invention.

In addition, referring to FIGS. 17-19, the other example for mounting the pump 3 includes the concave element, instead of the hook, on the top portion of the connection plate 81, on which the top portion of the pump fixing element 4 can hang, and the connection plate 81 having such an aspect (concave on the top portion thereof) and the pump fixing element 4 having the hook 4f can be combined to fix the pump. The connection plate 81 of such an aspect, referring to FIG. 18, FIG. 19, can preferably mount a plurality of vibration dampeners 81a made of such as viscoelastic material and aseismic gel having an adherence. In such an aspect, the backside of the pump fixing element 4h has no required 4 h illustrated in FIG. 16 (refer to FIG. 17). According to such a configuration, the two filtration blocks 2A, 2B and the pump 3 can be fixed and also, the noise due to pump vibration can be alleviated. It is preferable that the concave element set up on the top-portion of the connection plate 81 has a lightly wider width than the width of the top-portion (concave element) of the pump fixing element 4 and the pump fixing element 4 does not directly contact with the connection plate 81 when setting up. Specifically, the pump vibration would be prevented from propagating the vibration to the filtration unit cover through the connection plate 81 and as a result, the vibration sound of the pump can be suppressed.

Referring to FIG. 3, FIG. 5, the connection element 62 connects the strainer 70 and the water intake 3b of the pump 3, the connection element 63 connects the water exit 3c of the pump 3 and one opening 200b of the filtration block 2A, the connection element 64 connects the other opening 200c of the filtration block 2A and the opening 200c of the filtration block 2B, and the connection element 65 connects the opening 200b of the filtration block 2B and the shower piping 71.

In such a way, when used as the canister model, a plurality of filtration blocks 2 are rearranged so that the entire can be a thick model, so that the water purification system 1 would not overturn and can be set up stably.

The configuration of the portion set up inside the aquarium is basically the same as the hang-on-back model referring to FIG. 5, so that the inventor skips the explanation thereof.

(Functional Configuration as the Water Purification System)

Next, mainly referring to FIG. 6, FIG. 7, and FIG. 12, the inventor briefly sets forth the connection configuration and the flow of water-to-be-cleaned so as to function as the water purification system of the water purification system 1 according to the aspect of the Embodiment of the present invention.

In the following explanation, the inventor sets forth along the flow of the water-to-be-cleaned from upstream to downstream. For convenience sake, the filtration block closer to the pump 3, i.e., located in the upstream side of the flow passage of the water-to-be-cleaned is called a first filtration block and the next thereof in the downstream side is called a second filtration block.

As illustrated in FIG. 6, the connection element 62 connects the strainer 70 and the pump 3. The connection element 63 connects the pump 3 and the first filtration block 2A. The connection element 64 connects the first filtration block 2A and the second filtration block 2B. The connection element 65 connects the second filtration block 2 and the shower piping 71. The shower piping 71 is fixed inside the aquarium WT by the suction disk 79. Specifically, at least the strainer 70 and the shower piping 71 are set inside the aquarium as illustrated in FIG. 6.

Either when used as the hang-on-back model as illustrated in FIG. 1. FIG. 2 and FIG. 6 or when used as a canister model as illustrated in FIG. 3, FIG. 4, FIG. 5 and FIG. 7, the water purification system 1 is basically connected as set forth above despite different connection of the opening 200b, 200c. Accordingly, referring to FIG. 14, water-to-be-cleaned inside the aquarium is taken from the strainer set up inside the aquarium, passes through the inside of the connection element 62, the pump 3, the connection element 63, the first filtration block, the connection element 64 and the second filtration block in order to be cleaned and then expelled from the shower piping 71 set up inside the aquarium through the connection element 65, i.e., the purified water returns to the inside of the aquarium.

The aspect of the present Embodiment adopts the configuration set forth above, so that the present invention can provide a water purification system (device) used for an ornamental fish aquarium, which can be easily assembled as either canister or hang-on-back model without compromising with an aesthetic aspect.

Meantime, in addition to the configuration of the filtration main unit including the filtration material, bacteria growing therein are very important so that the water purification system actually functions. Cited documents 1 to 3 describe such bacteria in detail, and here, the inventor describes supplementarily. Relative to the filtration main unit 20 having the configuration set forth above, when the hang-on-back model referring to FIG. 6 and the canister model referring to FIG. 7 and given two units are connected, roughly eight cylinders 201 housing the filtration material are being connected water-passage-wise. Each application of eight cylinders housing each filtration material is not particularly limited, but for example, one cylinder at the upstream of water passage can be a mechanical filtration element and the lowest filtration material in the downstream can be a biological filtration element containing anaerobic bacteria, and six cylinders in-between can be biological filtration elements containing aerobic bacteria. A Filtration material appropriate for mechanical filtering can be housed to make the mechanical filtration element. The biological filtration element containing aerobic bacteria nutrient for aerobic bacteria, which enhances growth thereof, can be housed as the filtration material. For example, many of porous rings that ensure water flow and have a large surface area can be applied. The biological filtration element containing anaerobic bacteria, nutrient for anaerobic bacteria, which can be propagate such anaerobic bacteria, i.e., an organic carbon preparation, can be housed as the filtration material. For example, such organic carbon preparation can be made of an organic plastic insoluble in water.

Given applying such crafted filtration material; firstly, water-to-be-cleaned is filtered mechanically in the water intake-side (uppermost stream side) of the closed narrow long zigzag water passage, secondly, nitrification is carried out by propagating the aerobic bacteria, and at the last stage at which almost all oxygen are consumed by the aerobic bacteria, the anaerobic bacteria can be propagated, and overall, nitrification and denitrification can be continuously carried out in the same water passage while running the constant amount of water thereinside. In such a way, the water purification system that does not require to change aquarium water can be provided.

Other Embodiments

Figure 15:
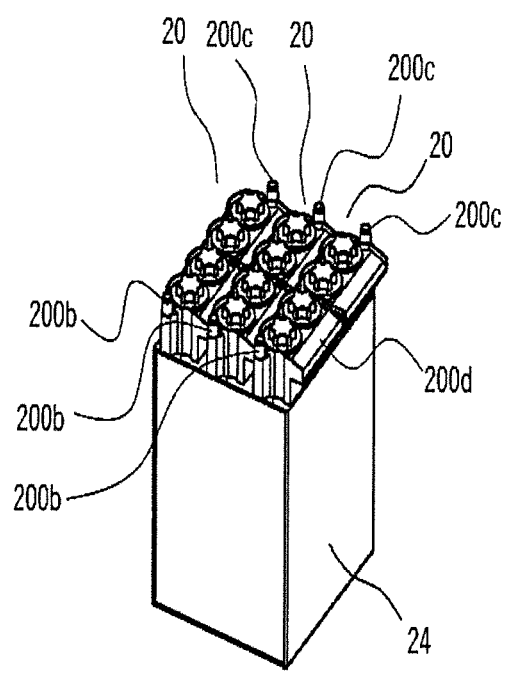
FIG. 15 is a perspective view illustrating the other configuration of the single filtration block according to another aspect of the present invention.
Figure 16:
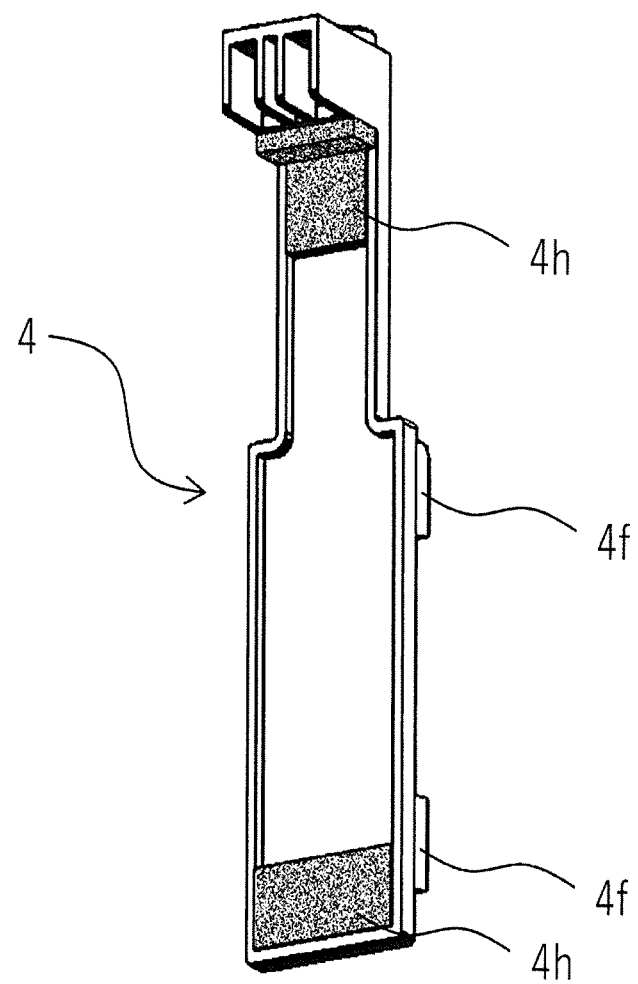
FIG. 16 is a schematic view illustrating the back surface of an aspect of the present invention.

Next, referring to FIG. 15, the inventor sets forth the aspect of another embodiment in which a water purification system and a filtration block are formed by arranging a plurality of the filtration main units 20 set forth above.

Referring to FIG. 15, according to the aspect of the present Embodiment, a plurality (not limited to three despite three in FIG.) of the filtration main units 20 in the bottom cover 24 having the opened top end is standing in the array, of which each opening 200b, 200c is facing upward and collectively housed in the direction toward increasing the thickness thereof. According to the embodiment set forth before, the filtration main unit 20 and the cover 21-23 are in one to one relationship, but in the present embodiment, the relationship is in one to plurality, which is different from one to another. In accordance with such difference, the length and the shape of the connection element and the connection method therefor can be different, which are applied to connect water-passage-wise the opening 200b, 200c as the water intake with the other external element such as a filtration main unit 20 and a pump. The more the number of the filtration main unit 20 put into one bottom cover 24 increments, the more the number of the connection element applied in one filtration block increments. Despite such a difference, provided a plurality of filtration main units is water-passage-wise connected with each other inside the block and also connected with the pump, the strainer and shower piping and so forth, and the filtration block is formed as one unit from the standpoint of appearance is functionable as the water purification system. The basic water flow as the water purification system is basically the same as the flow illustrated in FIG. 14. The length, shape and material property of the connection element are arbitrarily crafted and applied to connection so as to be functional, so that the other embodiment is not different from the embodiment set forth before at all. In addition, according to the aspect of the Embodiment referring to FIG. 15, no top-cover is applied, but the top-cover to mantle collectively the top-surface of a plurality of the filtration main unit 20 can be included. In such a case, such a top-cover should have the shape in which among more than four 200b or 200c, two openings 200b, 200c for the water intake and the water exit openings 200b or 200c, used to connect elements outside the block, can be exposed.

According to the aspect of the present Embodiment, one filtration main unit cover relative to a plurality of filtration main units 20 is set to make a filtration block, so that even when just one filtration block is used as a canister model, such a filtration block can be stable. Accordingly, just one filtration block can be connected to the pump, the strainer and the shower piping to form the canister model water purification system. Needless to say, multiple filtration blocks can be connected with the pump, the strainer and the shower piping to form the water purification system Provided the number of the filtration main unit 20 set inside one filtration block increments, the thickness and the weight thereof increase, so that the filtration block becomes inapplicable structure-wise for the hang-on-back model, but provided used as a canister model, increase of the thickness and the weight thereof is unlikely problematic. Rather, provided fixed as the canister model, it is advantageous that such a configuration, in which one filtration element cover per a plurality of filtration main unit is set up to provide the filtration block or the water purification system, can easily provide the water purification system or the filtration block than the other configuration in which multiple blocks are formed in the combination of one filtration main unit by one cover are formed (referring to FIG. 3, FIG. 4, FIG. 7). In addition, referring to FIG. 15, when a plurality of filtration main units 20 is arranged parallel in the direction in which thickness thereof increases, the through-holes 200e set up in the center of the convex element 200d are substantially in the same line with each other. Accordingly, when arranged in such a way, the preexisting L-shape fixing element 51 inserted into the through-hole 200e in advance is removed and a rod having enough length passing through 200e a plurality of through-hole in alignment can be inserted into the (plurality of) through-holes 200e alignment) to connect the through-holes each other (not illustrated in FIG. 15).

The inventor sets forth a plurality of the aspects of the embodiment of the present invention, but the embodiments set for above are just examples and the technical scope of the present invention is not limited thereto. The present invention is applicable in a variety of other embodiments and further, a variety of variations such as omission and/or replacement can be applied in the scope without departing the spirit of the present invention. Such embodiments and modifications thereof are included in the scope and gist of the invention described in such as specification of the present invention, and also included in the invention described in the claims and the scope of the equivalents thereof.

For example, the inventor set forth the configuration in which two filtration blocks are connected as to an example of a rectangular aquarium having 60 cm width, which is called type 60 in general, but the present invention can be applied to an aquarium having other size and the number of the filtration blocks to be connected is not limited two. For example, the number of the filtration blocks can be changed arbitrarily to 3, 4, 5, 6 and so forth in accordance with the size of the target aquarium, the volume of water-to-be-cleaned, the amount of filtration material needed based on a kind and the number of fishes therein. When filtration capability of the filtration block is the same, the filtration capability thereof can be improved by incrementing the number of the filtration block.

Accordingly, for example, referring to FIG. 1, it is advantageous that the operation is initiated with the configuration in which two filtration blocks are connected at the beginning, and then after, when needed to increase filtration capacity despite as-is the same size of the aquarium so that the number of fishes can be increased, or when needed to transfer the current water purification system to a larger aquarium, the current filtration block under the duty so far is continuously run as-is and then the filtration capability can be easily improved by further adding the new (extra) filtration block to be connected in line. At this time, for example, when 1 mechanical filtration element, 6 biological filtration elements with aerobic bacteria and 1 biological filtration element with anaerobic bacteria in order from the upstream side form the filtration element, the new filtration block is inserted in the middle between the current two filtration blocks to make the biological filtration element with aerobic bacteria, the cylinder at one upper stream (used be the aerobic bacteria) than the cylinder of the biological filtration element for anaerobic bacteria at the lowermost stream is taken out and one biological filtration element for anaerobic bacteria is added. In such an operational aspect, it is advantageous that the filtration capability can be easily improved without wasting current growing bacteria.

Specifically, after putting such as fishes and waterweed into the aquarium and start to operate the aquarium, when boosting the filtration capability is needed, the filtration block just can be added as needed, so that improvement of the filtration capability can be done easily and without wasting resources. In addition, when the aquarium is needed to be reset due to any incident, it is advantageous that when the filtration block with growing bacteria is ready to be used, reset of the aquarium can be easily accomplished. The filtration element with growing bacteria is a sort of treasure for a fish lover and replacement of such an element is not easy.

The inventor set forth the form of the filtration block is an approximately rectangular parallelepiped according to the above embodiment. The reason is that the when the filtration block is the rectangular parallelepiped, the filtration block can be easily combined. In addition, when the external wall surface of the aquarium to be set up is flat, the rectangular parallelepiped can be easily set up along the external wall surface of the aquarium.

In addition, according to an aspect of the embodiment set forth above, the inventor set forth the side-surface cover 21, 22 of the filtration element is flat, but not needed to be flat and for example, the corrugated form side-surface cover fit to the external form of the housing side-surface, i.e., form in which 4 cylinders are connected to one another, can be used. In such a case, it can be deemed without objection that the external form of the filtration block is an approximately rectangular parallelepiped overall.

In addition, as set forth above, provided the form of the filtration main unit 20 is based on the configuration in which 4 cylinders, i.e. filtration material cartridge as well, can be housed and the zigzag water passage can be formed, it is advantageous that the long, narrow and closed water passage can have a compact external form, but not limited thereto such a configuration. For example, when the number of the cylinder capable of housing the filtration material inside one filtration main unit is even number as 2, 4 and 6, as set forth above relative to the aspect of the above embodiment, an opening for the water intake and the water exit can be set up, but the number can be an odd number such as 1, 3, and 5. When the odd number of the cylinder is applied, one opening locates at the top portion and the other opening locates at the bottom portion. Accordingly, when the form of the cover is so as to expose the opening exposes, the structure thereof is somewhat complicated and handling the connection element (piping) when setting up is more or less difficult, but it is feasible. Nevertheless, the opening for the water intake and the water exit of water-to-be-cleaned are exposed and the configuration in which the filtration blocks are connectible respectively appearance-wise and water-passage-wise is applicable.

Specifically, regardless the number of a plurality of cylinders housing the filtration material, the filtration block may have the configuration in which the water exit of the number n cylinder is connected water-passage-wise with the water intake of the number n+1 cylinder and each cylinder stands in the perpendicular direction and is arrayed parallel. The plurality of filtration blocks are arrayed and the water exit of the number n filtration block is connected water-passage-wise with the water intake of the number n+1 filtration block, so that the water purification system has the configuration in which all of a plurality of cylinders housed in a plurality of filtration blocks are connected water-passage-wise and in series and the first layout, in which the plurality of filtration blocks are arrayed in line in the direction in which the length of the filtration block is increasing, and the second layout, in which the plurality of filtration blocks are arrayed in line in the direction in which the thickness of the filtration block is increasing, are exchangeable each other.

INDUSTRIAL APPLICABILITY

According to the above configuration, the present invention can provide a water purification system (device) and a filtration block, which can be easily assembled as either canister or hang-on-back model without compromising with an aesthetic aspect. After initiating the operation of water purification system, addition and connection of filtration block are easy and the filtration capacity per se can be improved in accordance with an expected practical application.

In the above explanation, the inventor set forth relative to the ornamental fish aquarium, but not limited thereto and the invention can be applied to an aquaculture fish tank and a sewage treatment facility on earth, water is contaminated due to general household sewage, industrial sewage, cattle waste, rain and snow containing air pollutant in air, groundwater contamination due to a variety of pesticides and so forth. When the water purification system and the filtration block of the present invention are applied, such contaminated water can be cleaned, and it is helpful to improve earth environment. In such a sense, industrial applicability is considered wider. The size of the filtration main unit and the filtration block, a kind of the filtration material packed therein, an amount and quality level of water-to-be-cleaned can be set arbitrarily in accordance with the setup target size and so forth.

REFERENCE OF SIGNS

1 Water purification system
2 Filtration block
20 Filtration main unit
21 Side-cover A of filtration unit
22 Side-cover B of filtration unit
23 Top-cover of filtration unit
3 Pump
3*a* Pump main unit
3*b* Pump water intake
3*c* Pump water exit
4 Fixing element to fix the pump
51 Fixing element (L-shaped stopper) to fix the filtration block 2 to the external wall of the aquarium
52 Fixing element (L-shaped stopper) to fix the pump to the external wall of the aquarium when applied as a hang-on-back model
59 Fixing element (screw) to fix the filtration block to the external wall of the aquarium
62 Connection element between the strainer and the pump
63 Connection element between the pump and the first block of the filtration unit
64 Connection element between the first filtration block and the second filtration block
65 Connection element between the second filtration block and the shower piping
70 Strainer
71 Shower piping
79 Fixing element (suction disk) to fix the shower piping to the external wall of the aquarium 81 Connection plate to connect each filtration block together (used for fixing pump)
82 Connection plate to connect each filtration block together
89 Fixing element (screw) to fix the connection plate to the filtration block
200 Housing of the filtration main unit
200a Cylinder (Column) housing
200b, 200c Opening to be connected with the connection element
200d Convex element set up at the top-portion of the housing of the filtration main unit
200e Through-hole into which the fixing element 51 is inserted
200g Convex element set up at the bottom-portion of the housing of the filtration main unit
201 Cylinder (Column)
202 Cylinder (Column) bottom-portion
203 Cylinder (Column) top-portion
204 Lid of the filtration main unit
WT Aquarium (Water Tank)

Also, the inventors intend that only those claims which use the words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by at least 20%, while still staying within the teachings of the present application, unless some different range is specifically mentioned. Where a specified logical sense is used, the opposite logical sense is also intended to be encompassed.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. A water purification system, that purifies water-to-be-cleaned by filtration, comprising:
    a filtration element comprising at least two filtration blocks connected to each other in a water-flow series;
    each of said filtration blocks comprising:
    a filtration main unit that has a housing that includes a plurality of cylindrical housing elements arrayed in a side-to-side series along respective parallel long axes thereof from a first narrow side to a second narrow side;
    a first side cover having a planar outer surface and an inner surface having a series of respective concave arcs shaped to supportingly receive respective said cylindrical housing elements on a first cover-side;
    a second side cover having a planar outer surface and an inner surface having a series of respective concave arcs shaped to supportingly receive respective said cylindrical housing elements on a second cover-side;
    each said cylindrical housing element having a top portion with an opening and a removable lid and a bottom portion;
    a convex portion extending from said top portion of each said cylindrical housing element away from said cylindrical housing elements perpendicularly to said respective long axes;
    a convex element between the bottom portions of one of a pair of said cylindrical housing elements engaging with one of said bottom portions of said first side cover and said second side cover;
    a top-cover that entirely covers a top of said filtration main unit and each said removable lid, wherein
    said top-cover covers said convex portion extending from said top portions of each said cylindrical housing element;
    each said cylindrical housing element receiving a removable filtration material member that is flow connected so that are connected in said water-flow-series between a first upper side opening on said first narrow side and a second upper side opening on said second narrow side;
    each of said first and said second upper side openings positioned distal said top-cover on opposing sides thereof;
    a through hole in at least one of said convex portions extending through said top portion of one of said respective cylindrical housing elements;
    a groove in said top-cover proximate said through hole; and
    a fixing element extending from said one top portion through said through hole in said at least one convex portion and along said groove in said top-cover operative to fix said water purification system to an aquarium.

2. The water purification system, according to claim 1, wherein:
    a first of said at least two filtration blocks is joined in said-water-flow series to a second of said at least two filtration blocks at respective ones of said upper side openings along proximate said ones of said first and second narrow sides.

3. The water purification system, according to claim 1, further comprising:
    at least one connection plate between said at least two filtration blocks;
    at least one vibration dampener mounted to said at least one connection plate; and
    wherein each of said at least one connection plate respectively connects and fixes said filtration blocks and said at least one vibration dampener dampens a vibration therebetween.

* * * * *